Aug. 7, 1928.
J. F. RAUSCHELBACH
1,679,944
AUTOMOBILE SIGNAL
Filed April 20, 1927
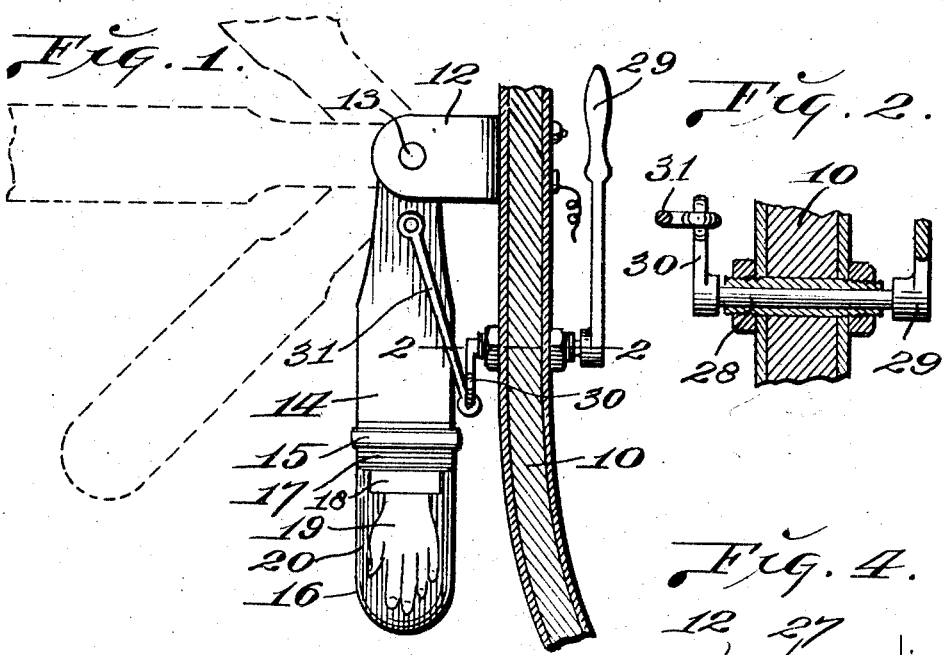
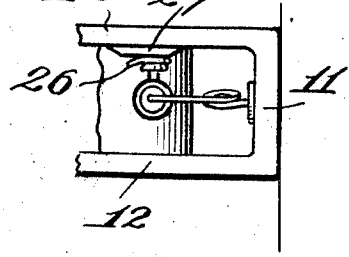
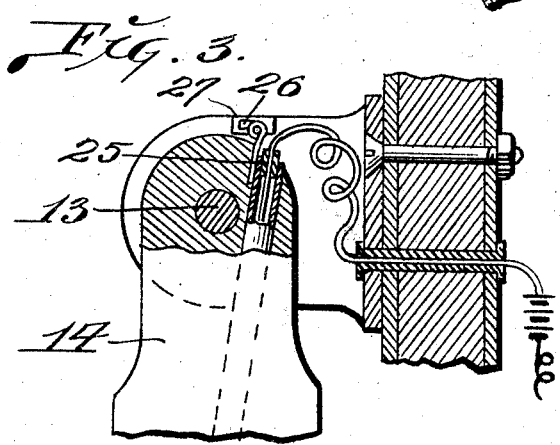
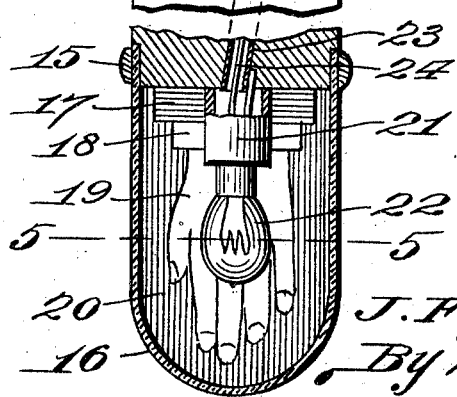
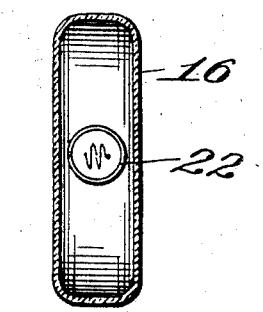
Inventor:—
J. F. Rauschelbach.
By Martin P. Smith Atty.

Patented Aug. 7, 1928.

1,679,944

UNITED STATES PATENT OFFICE.

JOHN F. RAUSCHELBACH, OF LOS ANGELES, CALIFORNIA.

AUTOMOBILE SIGNAL.

Application filed April 20, 1927. Serial No. 185,158.

My invention relates to a direction indicating signal for automobiles and has for its principal object the provision of a relatively simple, practical and easily operated signaling device for indicating to the drivers of following and approaching vehicles the intention of the driver of the equipped vehicle to turn either to the right or to the left or to check or stop the travel of his vehicle, thereby minimizing the danger of collisions.

It is customary for the drivers of motor vehicles that are not equipped with signaling devices to extend the arm from the side of the vehicle and raise or lower the same to indicate a turn in either direction or a stop and it is the purpose of my invention to provide a simple form of signaling means that may be readily actuated by the driver of a vehicle to swing a short semaphore or arm outwardly from the side of the car into position to give various direction indicating signals and which semaphore or arm is provided with a transparent or translucent portion bearing a direction indicating symbol, for instance a hand or an arrow head, and which transparent or translucent member contains an electric lamp that is automatically lighted when the arm is moved into signaling position, thereby enabling the indicating symbol on said arm to be readily observed at night.

With the foregoing and other objects in view, my invention consists in certain novel features of construction and arrangement of parts that will hereinafter be more fully described and claimed and illustrated in the accompanying drawing, in which—

Fig. 1 is a vertical section taken through the side wall of the body of a motor vehicle at a point adjacent to the left hand end of the dash or instrument board in front of the operator's seat and showing my improved signaling device in position for use.

Fig. 2 is an enlarged horizontal section taken on the line 2—2 of Fig. 1.

Fig. 3 is an enlarged elevational view of the signaling arm and its support with parts thereof in section.

Fig. 4 is a plan view of the inner portion of the bracket upon which the signaling arm is pivotally mounted.

Fig. 5 is a horizontal section taken on the line 5—5 of Fig. 3.

Referring by numerals to the accompanying drawings which illustrate a practical embodiment of my invention, 10 designates the left hand side wall of the body of an automobile and secured to the outer face thereof in any suitable manner at a suitable point in front of the driver's seat, is a bracket comprising a base plate 11 and a pair of outwardly projecting plates 12.

Seated in the plates 12 are the ends of a pin or bolt 13, upon which is loosely mounted one end of a short arm 14, preferably of wood or light metal such as aluminum, and detachably mounted on the lower end of this arm and retained thereon by a strap or clamping band 15, is an elongated hollow shell 16 that is preferably formed of celluloid and which is preferably semi-transparent translucent.

A portion 17 of this hollow member immediately adjacent to the end of the arm 14 has its inner surface painted or colored preferably dark blue to represent the end of a coat sleeve and a portion 18 of the surface immediately adjacent to said portion 17 is colored white to represent a portion of a cuff. The inner surface of portions 19 of the side walls of the hollow member 16 beyond the portion 18 are painted or colored white or gray to represent an open hand and those portions 20 of the side walls of the hollow member 16 that surround the colored portions 19 are painted or colored red.

Thus the transparent or translucent member 16, when viewed from front or rear, bears the distinctive representation of an open hand projecting from a cuff and the latter projecting from a coat sleeve, the hand being surrounded by a red field or border. This combination of colors will tend to attract attention when the arm is shifted into signaling position, and especially at night when the interior of the hollow member 16 is illuminated.

Secured to the end of arm 14 within the hollow member 16, is a socket 21 that receives a small electric lamp 22 and leading through the arm 14, is a small metal tube 23 that is electrically connected to one of the contact points within socket 21. Leading from the other one of the contact points within socket 21 through the tube 23, is a conductor 24 that passes through a plug 25 of insulation that is seated in the end of said tube opposite the end that is connected to the socket 21 and said conductor 24 is electrically connected to a suitable source of electrical energy, preferably the battery is carried by the equipped vehicle.

Electrically connected to the end of tube 13 that projects from the pivoted end of arm 14, is a small spring 26 that functions as a brush contact and which spring is adapted to bear against the inner face of one of the plates 12. Arranged on the inner face of the plate 12 with which the spring 26 engages, is a small plate 27 of insulating material and upon which said spring 26 bears when the signaling arm occupies its normal vertical position at the side of the vehicle, as illustrated in Figs. 1 and 3. Thus as long as the arm 14 maintains its inactive position, the electric circuit to the lamp 22 is open.

Seated in the side wall 10 of the vehicle body a short distance below the bracket that supports the signaling arm, is a short horizontally disposed shaft 28 on the inner end of which is mounted one end of a short hand lever 29. Mounted on the outer end of shaft 28 and extending downwardly therefrom, is a short crank arm 30 to the lower end of which is pivotally connected the lower end of a short upwardly and outwardly extending link 31, the upper end thereof being pivotally connected to a stud 32 that projects outwardly from the upper portion of arm 14, a distance below and outwardly from the pivot pin 13.

In the operation of my improved direction indicating signal, it is only necessary to engage the upper end of hand lever 29 and pull same toward the operator and following this movement, shaft 28 will be rotated and crank arm 30 will be swung upward. In turn, link 31 will be moved upward and signaling arm or semaphore 14 will be swung on its pivot 13 upwardly and outwardly into signaling position as shown by dotted lines in Fig. 1, thus indicating to the drivers of approaching and following vehicles the intentions of the operator of the signal as to the movements of the equipped vehicle.

As soon as the signaling arm has been moved a short distance outwardly and upwardly as just described, the free end of contact spring 26 will ride off the block of insulation 27 into engagement with the bracket that supports the signaling arm and thus the circuit to the lamp 22 is closed and said lamp will be lighted, thereby illuminating the interior of the transparent or semi-transparent member 16 and thus the signaling device may be readily observed at night.

Instead of being manually operated as herein described, the signal may include suitable mechanism whereby the shaft 28 may be rocked or rotated from a pedal or by suitable electric means that includes an electric magnet or solenoid.

Instead of utilizing the hollow translucent member 16 as herein illustrated and described, it may be found advantageous to utilize a single sheet of translucent material, such as celluloid, the same being pressed to form a hand or other direction indicating symbol and one face of this pressed sheet being colored and provided with a bright reflecting surface and where such construction is employed, the colored surface of the pressed section of material may be covered with a thin sheet of transparent material such as celluloid that affords protection to the colored surface.

A vehicle direction indicating signal of my improved construction is comparatively simple, is inexpensive of manufacture, may be easily operated when shifted into signaling position and is very effective in performing its intended functions.

It will be understood that minor changes in the size, form and construction of the various parts of my improved vehicle direction indicating signal may be made and substituted for those herein shown and described without departing from the spirit of my invention, the scope of which is set forth in the appended claims.

I claim as my invention:

1. In a direction indicating signal for automobiles, a bracket adapted to be secured to the side of a motor vehicle, an arm pivotally mounted on said bracket for vertical swinging movement, a hollow box-shaped member formed in a single piece from translucent material carried by the outer end of said arm, the side walls of which hollow member are substantially parallel, the central area of each side wall of said hollow member bearing the representation of an open hand and that portion of the side wall of the hollow member that surrounds the representation of said open hand being distinctively colored.

2. In a direction indicating signal for automobiles, a bracket adapted to be secured to the side of a motor vehicle, an arm pivotally connected to said bracket for vertical swinging movement, a hollow box-like member formed from a single piece of translucent material mounted on the outer end of said arm, the front and rear walls of which hollow member are substantially parallel, a portion in the center of each side wall of said hollow member being provided with the representation of an open hand, and each representation of an open hand and that portion of the side wall surrounding the same being distinctively colored.

3. In a direction indicating signal for automobiles, a bracket adapted to be secured to the side of a motor vehicle, an arm pivotally mounted on said bracket for vertical swinging movement, a hollow box-like member formed from a single piece of translucent material mounted on the outer end of said arm, the front and rear walls of which hollow member are substantially parallel, a portion in the center of each side wall of said hollow member being provided with the representation of an open hand, each representation of an open hand and that portion of the side wall surrounding the same being distinctively colored, and means for illuminating the interior of said hollow translucent member.

4. In a direction indicating signal for automobiles, a bracket adapted to be secured to the side of a motor vehicle, an arm pivotally connected to said bracket for vertical swinging movement, a hollow box-like member formed in a single piece from translucent material mounted on the outer end of said arm, the central area of one of the side walls of said hollow member being provided with the representation of an open hand, the size of which representation of an open hand is such that it is entirely surrounded by a substantial area of the side wall and said representation of an open hand and surrounding area being distinctively colored.

In testimony whereof I affix my signature.

JOHN F. RAUSCHELBACH.